United States Patent [19]
Lowen et al.

[11] 3,921,434
[45] Nov. 25, 1975

[54] MOTION DETECTING APPARATUS

[75] Inventors: Michael David Lowen, Berkhamsted; Ronald Newby, Boreham Wood, both of England

[73] Assignee: John Laing & Son Limited, London, England

[22] Filed: June 5, 1974

[21] Appl. No.: 476,401

[30] Foreign Application Priority Data
June 18, 1973 United Kingdom............ 28760/73

[52] U.S. Cl................................... 73/37; 73/521
[51] Int. Cl.²......................................... G01P 3/26
[58] Field of Search............... 73/37, 506, 515, 521; 137/826, 829, 830

[56] References Cited
UNITED STATES PATENTS

| | | | |
|---|---|---|---|
| 3,176,094 | 3/1965 | Ipsen | 73/521 X |
| 3,260,271 | 7/1966 | Katz | 73/521 X |
| 3,776,043 | 12/1973 | Welk, Jr. | 73/506 X |

*Primary Examiner*—Charles A. Ruehl
*Attorney, Agent, or Firm*—Kenyon & Kenyon Reilly Carr & Chapin

[57] ABSTRACT

An apparatus for detecting movement of a member having perforate and imperforate portions. The apparatus includes spaced fluid jet devices each provided with a fluid input and a fluid output which is spaced from the input. Each jet device is aligned with the perforate and imperforate portions of the member and the devices are so positioned that, when the member is stationary, fluid flow across at least one of the jet devices is interrupted, which condition is sensed by a drop in fluid pressure at the output and indicated by a visual or audible device.

3 Claims, 4 Drawing Figures

MOTION DETECTING APPARATUS

THE PRESENT INVENTION relates to apparatus for detecting movement and/or speed of movement of a member, such movement being linear or rotational.

The invention is directed more particularly, although not exclusively, to detecting the rotation of the count wheel described in our U.S. Pat. No. 3,812,749 in order to provide an effective fibre presence or snag sensor, or detecting the speed of rotation of the count wheel in order to indicate a faulty condition which causes the machine to slow down.

The present invention consists in an apparatus for detecting movement of a member having perforate and imperforate portions, said apparatus including spaced fluid jet devices each provided with a fluid input and a fluid output spaced from said input, the arrangement being such that each jet device is aligned with said perforate and imperforate portions of the member and said devices are so positioned that, when the member is stationary, fluid flow across at least one of the jets is interrupted, which condition is sensed by the drop in fluid pressure at the output and indicated by a visual or audible device.

The invention also consists in an apparatus for detecting the speed of movement below a predetermined level of a member having perforate and imperforate portions, said apparatus including a fluid jet device having a fluid input and a fluid output spaced from said input, the arrangement being such that the jet device is aligned with said perforate and imperforate portions of the member so that during movement of the latter, intermittent interruption of the fluid flow is caused by the imperforate portions and below a predetermined speed the period of interruption is sufficient to cause a drop in fluid pressure at the output, which condition is indicated by a visual or audible device.

In both apparatus referred to in the immediately preceding paragraphs, the input and output are preferably interconnected by a bypass passage.

In the accompanying drawings:-

Figure 1:
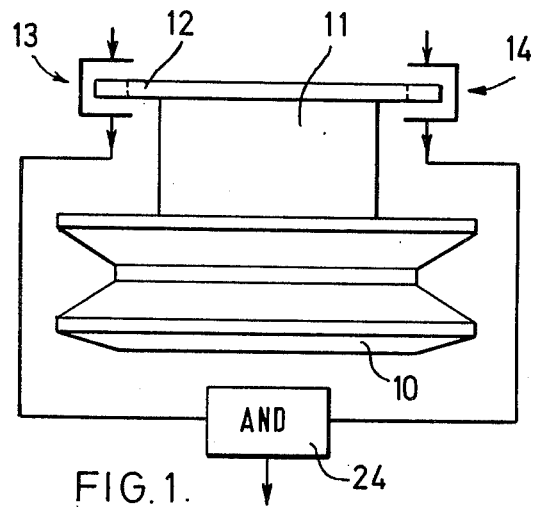
FIG. 1 is a diagrammatic view of a motion detecting apparatus according to the present invention showing the apparatus detecting a moving member.

In carrying the invention into effect according to one convenient mode by way of example, a wheel 10 is provided a boss 11 having an outwardly extending, castellated flange 12 positioned in the path of a pair of air jet devices 13, 14 of known type. Each device comprises a 'C'-shaped block 15 having an air input bore 16 through its upper arm 17 in alignment with an air output bore 18 formed in its lower arm 19 and a bypass passage 20 in the block body 21 which has a restrictor 22 therein interconnecting the input and output bores 16, 18, respectively. The bypass passage 20 prevents the ingress of dust into the output side of the system and the use of a variable restrictor, or of a restrictor of different diameter enables the response time of the devices to be varied.

Figure 2:
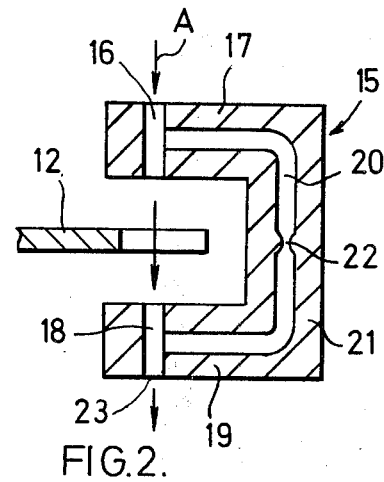
FIG. 2 is a diagrammatic view of air jet device of the apparatus shown in FIG. 1 with air flow across the jet.
Figure 3:
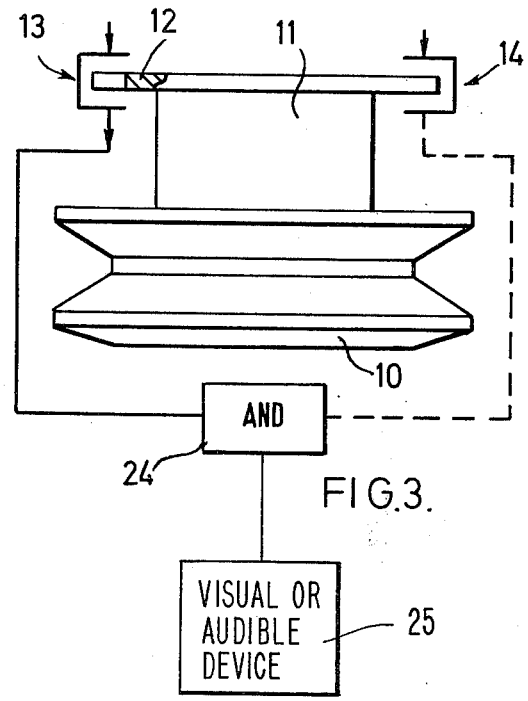
FIG. 3 is a view similar to FIG. 1, but showing the apparatus detecting a stationary member.
Figure 4:
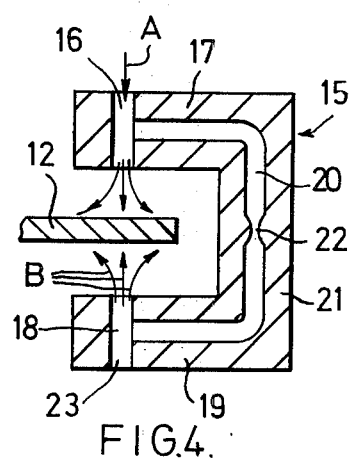
FIG. 4 is a view similar to FIG. 2, but showing the stationary member blocking air flow across the jet.

The wheel flange 12 is positioned between the arms 17, 19 of each block so that during rotation of the wheel 10, as the perforate portions of the flange 12 coincide with the aligned bores 16, 18, air flow is established across the respective devices 13, 14 as shown in FIGS. 1 and 2 and when the imperforate portions of the flange 12 coincide with the aligned bores 16, 18, air flow is interrupted as shown in FIGS. 3 and 4 and the condition is indicated by a visual or audible device.

Thus, during rotation of the wheel 10 the air flow across the jet devices 13, 14 is intermittently interrupted by the castellations and the devices 13, 14 are so positioned that for any position of the wheel 10 at least one jet is interrupted. It will be appreciated that if only one jet device was used, the wheel 10 would be able to stop with the castellations either interrupting, or not interrupting, the flow of air across the jet and therefore two devices are necessary, positioned as referred to above, to sense when the wheel 10 is stationary.

As shown in FIG. 2, air supplied to each device 13, 14 passes through the input bore 16 as indicated by the arrow A and a portion thereof passes through the restricted bypass passageway 20 to the output bore 18 and an output port 23. The greater mass flow forming an air jet from the input bore 16 effectively restricts the flow from the output bore 18 thus creating a back pressure and therefore flow or pressure at the output port 23. If the air jet from the input bore 16 is interrupted as shown in FIG. 4, the air flow through the restricted passageway 20 vents through the output bore 18 as indicated by the arrow B, thus reducing the pressure or flow at the output port 23.

Each jet device 13, 14 gives an output signal through the output port 23, i.e. positive air pressure when uninterrupted and no signal when interrupted and each device 13, 14 has a response time, e.g. a period of time which elapses between the jet being interrupted and the output signal dying away. Therefore if the interruptions occur at a frequency greater than the response time of the device 13, 14 its output state remains the same. When the wheel 10 is rotating, the interruptions caused by the castellations are of such short duration that each jet device 13, 14 "senses" the castellations as a continuous opening.

The jet devices 13, 14 are connected in a circuit in which low pressure air is supplied to the input bores 16 of both jet devices and the output ports 23 from each supply an AND gate 24. In operation, the AND gate 24 produces an output signal only if outputs are present from both jet devices 13, 14 as shown in FIG. 1 and if the output from the AND gate 24 disappears as shown in FIG. 3 this information can be used as required, for example, if the wheel 10 is used as the count wheel of our U.S. Pat. No. 3,812,749, the rotation or otherwise, of this wheel 10 could be sensed and would thus provide an effective fibre presence and snag detector also, the aabsence of the output signal from the AND gate 24 can be used to activate a visual or audible device 25 (FIG. 3), as is known, to indicate this condition.

The arrangement can also be made to detect speed variations of the wheel 10 by using only one air jet device 13 or 14. Thus, if the response time of the jet device is varied and/or the extent of the castellations is altered, the arrangement is such that below a predetermined speed of rotation, the interruptions caused by the flange 12 are of such duration as to change the output from the jet device. If this arrangement is used in combination with the count wheel of our U.S. Pat. No. 1,329,892 faults can be detected in the operation which cause the machine to slow down, e.g. a reduction of the air supply below a useful operating level.

It will be appreciated that the perforate and imperforate portions of the flange 12 may be formed by any suitable configuration, e.g. a sinusoidal outline or spaced apertures having a closed perimeter.

We claim:

1. An apparatus for detecting movement of a member having perforate and imperforate portions, said apparatus including spaced fluid jet devices each provided with a fluid input and a fluid output spaced from said input and interconnected by a bypass passage, the arrangement being such that each jet device is aligned with said perforate and imperforate portions of the member and said devices are so positioned that, when the member is stationary, fluid flow across at least one of the jets is interrupted, which condition is sensed by the drop in fluid pressure at the output and indicated by a visual or audible device.

2. An apparatus as claimed in claim 1, wherein the bypass passage is provided with a restrictor.

3. An apparatus as claimed in claim 1, wherein the perforate and imperforate portions of said member comprise a castellated flange.

* * * * *

UNITED STATES PATENT AND TRADEMARK OFFICE
CERTIFICATE OF CORRECTION

PATENT NO. : 3,921,434
DATED : November 25, 1975
INVENTOR(S) : Michael David Lowen et al It is certified that error appears in the above–identified patent and that said Letters Patent are hereby corrected as shown below:

Column 2, line 56, "aabsence" should be --absence--.

Column 2, ast line, "1,329,892" should be --3,812,749--.

Signed and Sealed this twenty-seventh Day of April 1976

[SEAL]

Attest:

RUTH C. MASON
Attesting Officer

C. MARSHALL DANN
Commissioner of Patents and Trademarks